United States Patent
Khan et al.

(10) Patent No.: US 10,206,082 B2
(45) Date of Patent: Feb. 12, 2019

(54) PRIORITY BASED ROUTING OF DATA ON AN ELECTRONIC DEVICE

(71) Applicant: Apple Inc., Cupertino, CA (US)

(72) Inventors: Ahmer A. Khan, Cupertino, CA (US); Zachary A. Rosen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 40 days.

(21) Appl. No.: 15/174,859

(22) Filed: Jun. 6, 2016

(65) Prior Publication Data

US 2016/0360352 A1   Dec. 8, 2016

Related U.S. Application Data

(60) Provisional application No. 62/172,181, filed on Jun. 7, 2015.

(51) Int. Cl.
| | |
|---|---|
| *H04W 4/00* | (2018.01) |
| *H04W 4/80* | (2018.01) |
| *H04L 12/725* | (2013.01) |

(52) U.S. Cl.
CPC ............ *H04W 4/80* (2018.02); *H04L 45/306* (2013.01)

(58) Field of Classification Search
CPC .................................................. H04W 4/008
USPC ..................................... 455/41.1, 41.2, 41.3
See application file for complete search history.

(56) References Cited

U.S. PATENT DOCUMENTS

2016/0086159 A1* 3/2016 Golla ................. G06Q 20/3229
 705/76
2016/0142109 A1* 5/2016 Kumar ................. H04B 5/0031
 455/41.1

OTHER PUBLICATIONS

"NFC Controller Interface (NCI) Specification." NFC Forum, NCI 1.0, Nov. 6, 2012, 146 pages.
"Host Card Emulation (HCE) 101." Smart Card Alliance, Mobile & NFC Council, Aug. 2014, 32 pages.
"NFC Digital Protocol." NFC Forum, Digital 1.0, Nov. 17, 2010, 194 pages.
"Open NFC—Security Stack." Dec. 27, 2011, 20 pages.

* cited by examiner

*Primary Examiner* — Wen Huang
(74) *Attorney, Agent, or Firm* — Van Court & Aldridge LLP

(57) ABSTRACT

Systems, methods, and computer-readable media for priority based routing on an electronic device of data received from a processing subsystem are provided. In some embodiments, a method may include detecting on an electronic device that data received from a remote subsystem includes identifier information that is associated with a match element of an entry of a routing table, routing at least a portion of the data to a first priority destination identified by the entry, and, when the routing of the at least a portion of the data to the first priority destination identified by the entry is not successful, routing the at least a portion of the data to a second priority destination identified by the entry, wherein the second priority destination identified by the entry is different than the first priority destination identified by the entry.

20 Claims, 10 Drawing Sheets

| MATCH ELEMENT | 1st PRIORITY DESTINATION | 2nd PRIORITY DESTINATION | |
|---|---|---|---|
| AID-X | 1st SECURE ELEMENT 150-1 | APPLICATION PROCESSOR 102 | ~191-1 |
| AID-Y | 1st SECURE ELEMENT 150-1 | | ~191-2 |
| AID-Z | APPLICATION PROCESSOR 102 | 1st SECURE ELEMENT 150-1 | ~191-3 |
| 7816 SELECT AID | 1st SECURE ELEMENT 150-1 | APPLICATION PROCESSOR 102 | ~191-4 |
| PROTOCOL_ISODEP | 1st SECURE ELEMENT 150-1 | | ~191-5 |
| PROTOCOL_NFCDEP | APPLICATION PROCESSOR 102 | | ~191-6 |
| TYPE A | 1st SECURE ELEMENT 150-1 | | ~191-7 |
| TYPE B | 1st SECURE ELEMENT 150-1 | | ~191-8 |
| TYPE F | 2nd SECURE ELEMENT 150-2 | | ~191-9 |

PRIORITY BASED ROUTING OF DATA ON AN ELECTRONIC DEVICE

CROSS-REFERENCE TO RELATED APPLICATION(S)

This application claims the benefit of prior filed U.S. Provisional Patent Application No. 62/172,181, filed Jun. 7, 2015, which is hereby incorporated by reference herein in its entirety.

TECHNICAL FIELD

This disclosure relates to the routing of data on an electronic device, including to the priority based routing of data between a processing subsystem and an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are received by the electronic device and may be routed to one of multiple destinations on the electronic device. However, the routing of such communications within a device is often inefficient.

SUMMARY OF THE DISCLOSURE

This document describes systems, methods, and computer-readable media for priority based routing in an electronic device of data received from a processing subsystem.

For example, a method for processing received data on an electronic device may be provided that includes receiving, by the electronic device, new data from a remote subsystem, detecting, by a processor of the electronic device, that the received new data includes a valid select command, identifying an application identifier associated with the valid select command, isolating, in a routing table including a plurality of entries, a target entry of the plurality of entries by determining that a match element of the target entry is associated with the identified application identifier, attempting to route, with the processor, at least a portion of the received new data to a highest priority destination associated with the target entry, wherein the highest priority destination includes a first data destination, determining whether the attempt to route the at least a portion of the received new data to the highest priority destination was successful, when the attempt to route was not successful, determining a next highest priority destination associated with the target entry, wherein the next highest priority destination includes a second data destination that is different than the first data destination, and attempting to route, with the processor, the at least a portion of the received new data to the next highest priority destination.

As another example, an electronic device may be provided that includes a first data destination, a second data destination that is different than the first data destination, a routing table including a plurality of entries, wherein at least a specific entry of the plurality of entries includes a match element and identification of at least two priority destinations including a first priority destination and a second priority destination, and a processor operative to receive new data from a remote subsystem, detect that the received new data includes identifier information that is associated with the match element of the specific entry of the routing table, attempt to route, responsive to the detection, at least a portion of the received new data to the first priority destination of the specific entry, wherein the first priority destination of the specific entry is the first data destination, and, when the attempt is not successful, route the at least a portion of the received new data to the second priority destination of the specific entry, wherein the second priority destination of the specific entry is the second data destination.

As yet another example, a non-transitory computer-readable storage medium may be provided storing at least one program comprising instructions, which when executed, cause an electronic device to detect that data received from a remote subsystem includes identifier information associated with a match element of a designated entry of a plurality of entries of a routing table, route at least a portion of the received data to a first priority destination identified by the designated entry, and, when the routing of the at least a portion of the received data to the first priority destination is not successful, route the at least a portion of the received data to a second priority destination identified by the designated entry, wherein the second priority destination is different than the first priority destination.

As yet another example, a method for managing a routing table on an electronic device may be provided that includes adding a new credential to the electronic device, when the new credential is a first type of credential, adding a new entry to the routing table that is uniquely associated with the new credential, and, when the new credential is a second type of credential that is different than the first type of credential, refraining from adding a new entry to the routing table that is uniquely associated with the new credential.

As yet another example, a method for handling data on an electronic device from a remote subsystem may be provided, wherein the electronic device includes a processor, a first data destination, a second data destination that is different than the first data destination, and a routing table including a plurality of entries, wherein each entry of the plurality of entries includes a match element and identification of at least one priority destination, and wherein the at least one priority destination of each entry of the plurality of entries includes a highest priority destination. The method includes receiving, with the electronic device, new data from the remote subsystem, detecting, with the processor, that the received new data includes a valid select command, identifying, with the processor, an application identifier of the valid select command, isolating, with the processor, a particular entry of the plurality of entries of the routing table by determining that the match element of the isolated particular entry is associated with the identified application identifier of the valid select command, attempting to route, with the processor, at least a portion of the received new data to the highest priority destination of the isolated particular entry, wherein the highest priority destination of the isolated particular entry includes the first data destination, when the attempt to route the at least a portion of the received new data to the highest priority destination of the isolated particular entry is not successful, determining, with the processor, whether the at least one priority destination of the isolated particular entry further includes a next highest priority destination, and, when the at least one priority destination of the isolated particular entry is determined to further include the next highest priority destination, attempting to route, with the processor, the at least a portion of the received new data to the next highest priority destination of the isolated particular entry, wherein the next highest priority destination of the isolated particular entry includes the second data destination.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 6 shows an illustrative data structure that can be implemented by the example electronic device of FIGS. 1-4 for routing data.

DETAILED DESCRIPTION OF THE DISCLOSURE

A routing table may be utilized by a controller of an electronic device to determine how to route received data. An application identifier may be identified in a frame of received data and then a particular entry in the routing table may be isolated that is associated with the identified application identifier of the received data. The isolated routing table entry may include identification of at least two different destinations to which at least a portion of the received data may be routed, where each of the at least two different destinations may be prioritized in some order, such that a highest priority destination of the isolated routing table entry may be used initially to attempt to route the data to that highest priority destination and then, if that initial attempt is unsuccessful, a next highest priority destination of the isolated routing table entry may next be used to attempt to route the data to that next highest priority destination. The isolated routing table entry may be associated with the identified application identifier of the received data by including a match element that includes the identified application identifier of the received data, where such an isolated routing table entry may be an entry of an application identifier based routing subset of the entries of the routing table. Alternatively, the isolated routing table entry may be associated with the identified application identifier of the received data when all other routing table entries of the routing table are determined not to include the identified application identifier of the received data, where such an isolated routing table entry may be an entry of a protocol based routing subset of the entries of the routing table. By utilizing a routing table that includes at least one routing table entry that identifies at least two different prioritized destinations, the electronic device may not need to update the routing table every time a new credential (e.g., a new secure element applet or a new host-based card emulation application) is added to the device.

Figure 1:
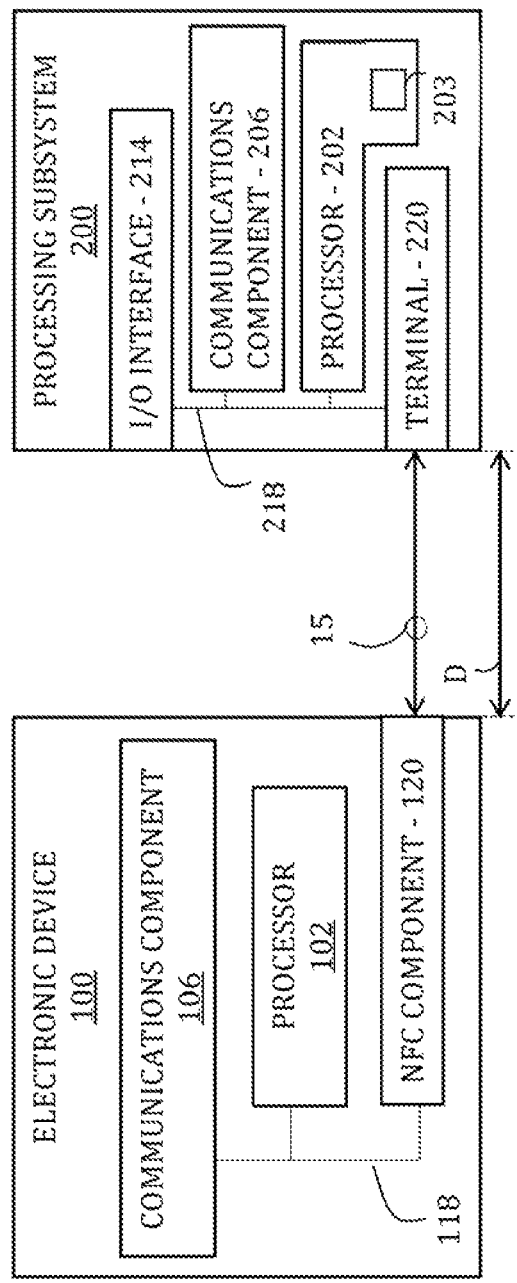
FIG. 1 is a schematic view of an illustrative system for priority based routing of data on an example electronic device.

FIG. 1 shows a system 1 in which priority based routing in an electronic device 100 of data received from a processing subsystem 200 may be enabled with respect to one or more credentials that may be provisioned on electronic device 100. The credentials may be provisioned on electronic device 100 by any suitable credential provisioning subsystem (not shown (e.g., a loyalty program provider subsystem, a financial institution subsystem, etc.)), where a credential may be used for conducting (e.g., funding) a transaction with processing subsystem 200. In some embodiments, an administration entity subsystem (not shown (e.g., an authorizing subsystem that may be operated by a trusted entity of device 100 (e.g., Apple Inc., which may be a manufacturer of device 100))) and may be used for enabling secure provisioning of credentials on device 100 (e.g., credentials from a credential provisioning subsystem and/or directly from the administration entity subsystem). FIGS. 2-4 and 6 show further details with respect to particular embodiments of electronic device 100 of system 1, while FIGS. 5 and 7-10 are flowcharts of illustrative processes for routing data in the context of system 1.

FIG. 1 is a schematic view of an illustrative system 1 that may allow for priority based routing in an electronic device of data received from a processing subsystem. For example, as shown in FIG. 1, system 1 may include an end-user electronic device 100, which may include a processor 102, a communications component 106, and a near field communication ("NFC") component 120. Electronic device 100 may be configured to store one or more credentials that may be provisioned on electronic device 100 (e.g., via communications component 106) by any suitable credential provisioning subsystem (not shown) directly or via any suitable administration entity subsystem (not shown). Moreover, as shown in FIG. 1, system 1 may also include a processing subsystem 200 with a terminal 220 that may be operative to conduct contactless proximity-based communications 15 (e.g., near field communications) with NFC component 120 of electronic device 100 (e.g., communications that may include information associated with a credential provisioned on device 100 that may then be used by processing subsystem 200 in conjunction with an appropriate credential provisioning subsystem for completing a transaction).

Figure 2:
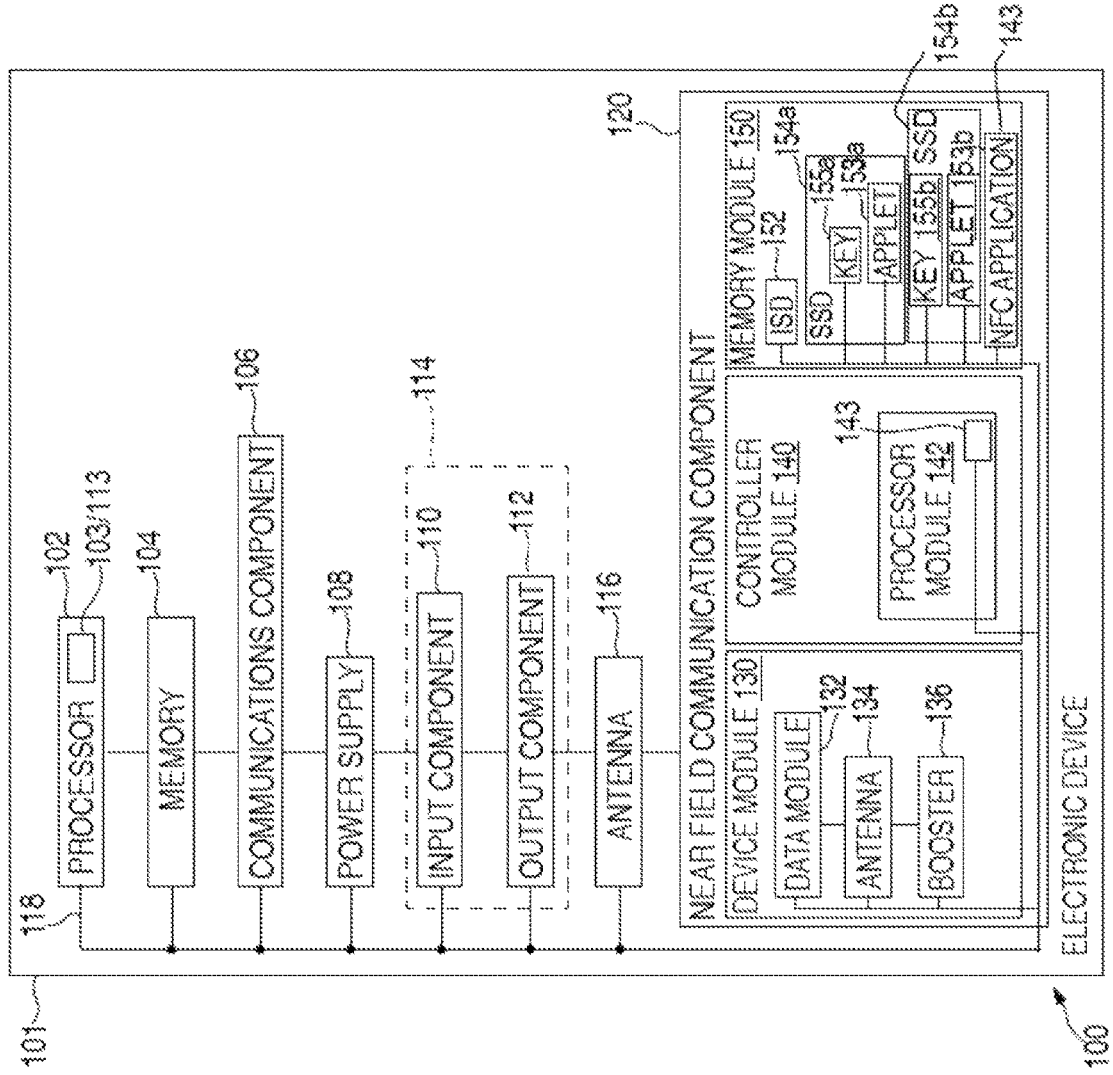
FIG. 2 is a more detailed schematic view of the example electronic device of the system of FIG. 1.

As shown in FIG. 2, electronic device 100 may include processor 102, memory 104, communications component 106, power supply 108, input component 110, output component 112, antenna 116, and NFC component 120, where input component 110 and output component 112 may sometimes be a single I/O component or I/O interface 114, such as a touch screen, that may receive input information through a user's touch of a display screen and that may also provide visual information to a user via that same display screen. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting transactions with remote processing subsystems) and, in other embodiments, electronic device 100 may perform multiple functions (e.g., a device that conducts transactions with remote processing subsystems, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), transaction information (e.g., information such as credit card information), wireless connection information (e.g., information that may enable device 100 to establish a wireless connection), subscription information, contact information, calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 of electronic device 100 may include any processing circuitry that may be operative to control the operations and performance of one or more components of electronic device 100 based on any suitable accessible application. Application 103/113/143 may be accessed by processor 102 from any suitable source, such as from memory 104 (e.g., via bus 118) or from another device or server (e.g., via communications component 106). Each one of applications 103, 113, and/or 143 may include, but is not limited to, one or more operating system applications, firmware applications, media playback applications, media editing applications, communication applications, NFC applications, banking applications, loyalty applications, transit applications, biometric feature-processing applications, or any other suitable applications. For example, processor 102 may load an application 103/113/143 as a user interface program to determine how instructions or data received via an input component 110 and/or communications component 106 and/or antenna 116 and/or NFC component 120 and/or other component of device 100 may manipulate the way in which information may be stored and/or provided to the user or otherwise via an output component 112 and/or communications component 106 and/or antenna 116 and/or NFC component 120 and/or other component of device 100. As one example, application 103 may be an operating system application while application 113 may be a third party application (e.g., an application associated with a processor or merchant or operator of processing subsystem 200 and/or an application associated with a credential provisioning subsystem and/or an application generated or maintained by an administration entity subsystem, such as card management applications, banking applications, transit applications, loyalty card applications, and the like). Processor 102 may also be used to at least partially generate, store, share, and/or maintain a routing table (e.g., routing table 199, described below)).

NFC component 120 may be any suitable proximity-based communication mechanism that may enable any suitable contactless proximity-based transactions or communications 15 between electronic device 100 and processing subsystem 200 (e.g., terminal 220 of processing subsystem 200 (e.g., a merchant payment terminal)). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and processing subsystem 200 may occur within any suitable close range distance between device 100 and processing subsystem 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 220 of processing subsystem 200).

NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and at least one NHC memory module 150. NFC device module 130 may include an NFC data module 132, an NFC antenna 134, and an NFC booster 136. NFC controller module 140 may include at least one NFC processor module 142 that may operate in conjunction with NFC device module 130 to enable, activate, allow, and/or otherwise control NFC component 120 for communicating NFC communication 15 between electronic device 100 and processing subsystem 200. NFC processor module 142 may exist as a separate component, may be integrated into another chipset, or may be integrated with processor 102, for example, as part of a system on a chip ("SoC"). NFC processor module or NFC controller 142 may be used to run one or more applications 143, such as a routing application (e.g., implementing a routing table (e.g., table 199, described below) that may be used by NFC processor module 142 in performing the routing of communications from processing subsystem 200 to host processor 102 and/or NFC memory module 150 and/or therebetween), an NFC low power mode, or a wallet application, that may help dictate the function of NFC component 120, where application 143 may or may not be accessed by NFC processor module 142 from memory module 150 or any other portion of device 100. NFC controller module 140 may include one or more protocols, such as the Near Field Communication Interface and Protocols ("NFCIP-1"), for communicating with another NFC device (e.g., processing subsystem 200). The protocols may be used to adapt the communication speed and to designate one of the connected devices as the initiator device that controls the near field communication. NFC memory module 150 may operate in conjunction with NFC device module 130 and/or NFC controller module 140 to allow for NFC communication 15 between electronic device 100 and processing subsystem 200. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of at least one secure element, which may be tamper resistant.

Figure 4:
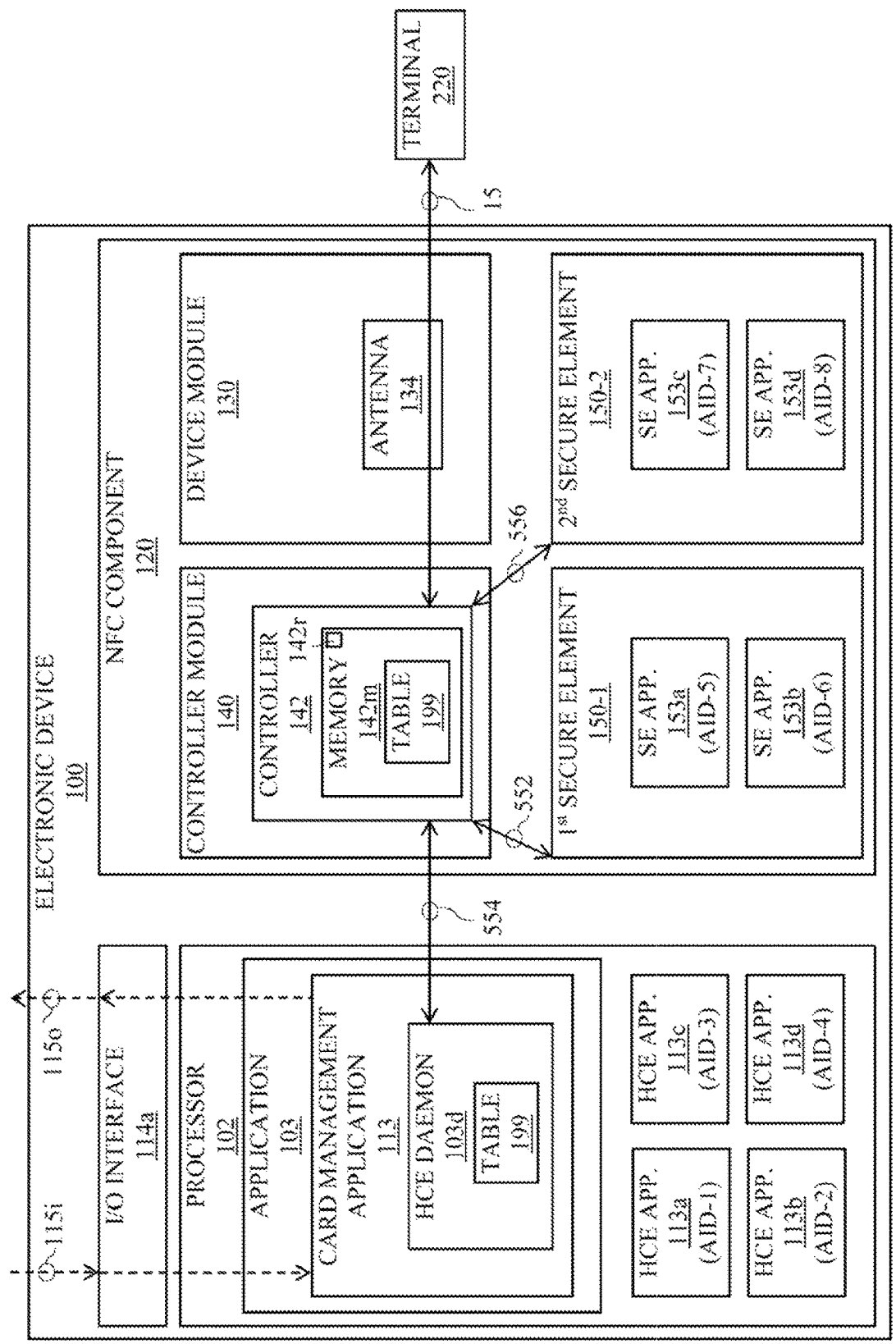
FIG. 4 is another more detailed schematic view of the example electronic device of FIGS. 1-3.

NFC memory module 150 may be tamper resistant and may provide at least a portion of at least one secure element (see, e.g., secure elements 150-1 and 150-2 of FIG. 4). For example, such a secure element may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of a credential provisioning subsystem and/or of an administration entity subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. A secure element may be a highly secure, tamper-resistant hardware component within a chip, which may be used for storing sensitive data or applications on electronic device 100. At least a portion of a secure element (e.g., secure element 150-1 and/or secure element 150-2) may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of a secure element may be provided in an integrated circuit that may be embedded into electronic device 100 during manufacturing of device 100. Alternatively or additionally, at least a portion of a secure element may be provided in a peripheral device that can be plugged into, inserted into, or otherwise coupled to electronic device 100, such as a micro secure digital ("SD") memory card.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to processing subsystem 200 as NFC communication 15. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of a secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

NFC transceiver or NFC antenna 134 may be any suitable antenna or other suitable transceiver circuitry that may generally enable communication of communication 15 from NFC data module 132 to processing subsystem 200 and/or to NFC data module 132 from subsystem 200. Therefore, NFC antenna 134 (e.g., a loop antenna) may be provided specifically for enabling the contactless proximity-based communication capabilities of NFC component 120. Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 15 between NFC data module 132 of NFC device module 130 and another entity (e.g., processing subsystem 200) where NFC device module 130 may include NFC booster 136, which may be configured to provide appropriate signal amplification for data of NFC component 120 (e.g., data within NFC data module 132) so that such data may be appropriately transmitted by shared antenna 116 as communication 15 to subsystem 200.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing institution (e.g., an administration entity subsystem and/or credential provisioning subsystem) may store keys and/or other suitable information for creating or otherwise provisioning one or more credentials (e.g., credentials that may be associated with various credit cards, bank cards, gift cards, access cards, loyalty cards, transit cards or passes, digital currency (e.g., bitcoin and associated payment networks), etc.) on electronic device 100 (e.g., via communications component 106), for credential content management, and/or for security domain management. A specific supplemental security domain ("SSD") 154 (e.g., one of SSDs 154a and 154b) may be associated with a particular TSM and at least one specific credential (e.g., a specific credit card credential or a specific public transit card credential) that may provide specific privileges or payment rights to electronic device 100. Each SSD 154 may have its own manager key 155 (e.g., a respective one of keys 155a and 155b) and at least one of its own credential applications or credential applets (e.g., Java card applet instances) associated with a particular credential (e.g., credential applet 153a of SSD 154a and credential applet 153b of SSD 154b), where a credential applet may need to be activated to enable its associated credential (e.g., commerce credential information (e.g., information associated with a particular payment account or loyalty account or transit account or stored value)) for use by NFC device module 130 as at least a portion of an NFC communication 15 between electronic device 100 and processing subsystem 200.

Although not shown in FIG. 1, an administration entity subsystem may be provided within system 1, where the administration entity subsystem may be configured to provide a layer of security and/or to provide a more seamless user experience when it is being determined whether or not to provision a credential from a credential provisioning subsystem or elsewhere on device 100 and/or whether or not to remove a credential from device 100. Such an administration entity subsystem may be provided by a specific administration entity that may offer various services to a user of device 100. As just one example, an administration entity subsystem may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, Apple Watch™, or the like). Additionally or alternatively, such an administration entity subsystem may be provided by a network operator (e.g., a mobile network operator, such as Verizon or AT&T, which may have a relationship with a user of device 100 (e.g., a data plan for enabling the communication of data over a certain communication path and/or using a certain communication protocol with device 100)). The administration entity that may provide, manage, or at least partially control the administration entity subsystem may be distinct and independent from any credential provisioning subsystem that may furnish one or more credentials on device 100. Additionally or alternatively, such an administration entity may leverage its ability to configure or control various components of device 100 (e.g., software and/or hardware components of device 100 when that administration entity at least partially produces or manages device 100) in order to provide a more seamless user experience for a user of device 100 when he or she wants to provision a credential offered by a credential provisioning subsystem on device 100 or remove a credential therefrom.

An SMP broker component of such an administration entity subsystem may be configured to manage user authentication with an administration entity user account. Such an SMP broker component may also be configured to manage the life cycle and provisioning of credentials on device 100. An SMP broker component may be a primary end point that may control the user interface elements on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with a secure element of NFC component 120. Such APDUs may be received by the administration entity subsystem from a credential provisioning subsystem via a trusted services manager ("TSM") of system 1. An SMP TSM component of the administration entity subsystem may be configured to provide GlobalPlatform-based services that may be used to carry out credential provisioning operations on device 100 for a credential from a credential provisioning subsystem. GlobalPlatform, or any other suitable secure channel protocol, may enable such an SMP TSM component to properly communicate and/or provision sensitive account data between a secure element of device 100 and a TSM for secure data communication between the administration entity subsystem and a credential provisioning subsystem. Any suitable communications path may be provided by system 1 between device 100 and such an administration entity subsystem and/or between device 100 and such a credential provisioning subsystem and/or between such an administration entity subsystem and such a credential provisioning subsystem. One or more of such communications paths may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of such communications paths, which may be capable of providing communications using any suitable wired or wireless communications protocol. For example, one or more of such communications paths may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Figure 3:
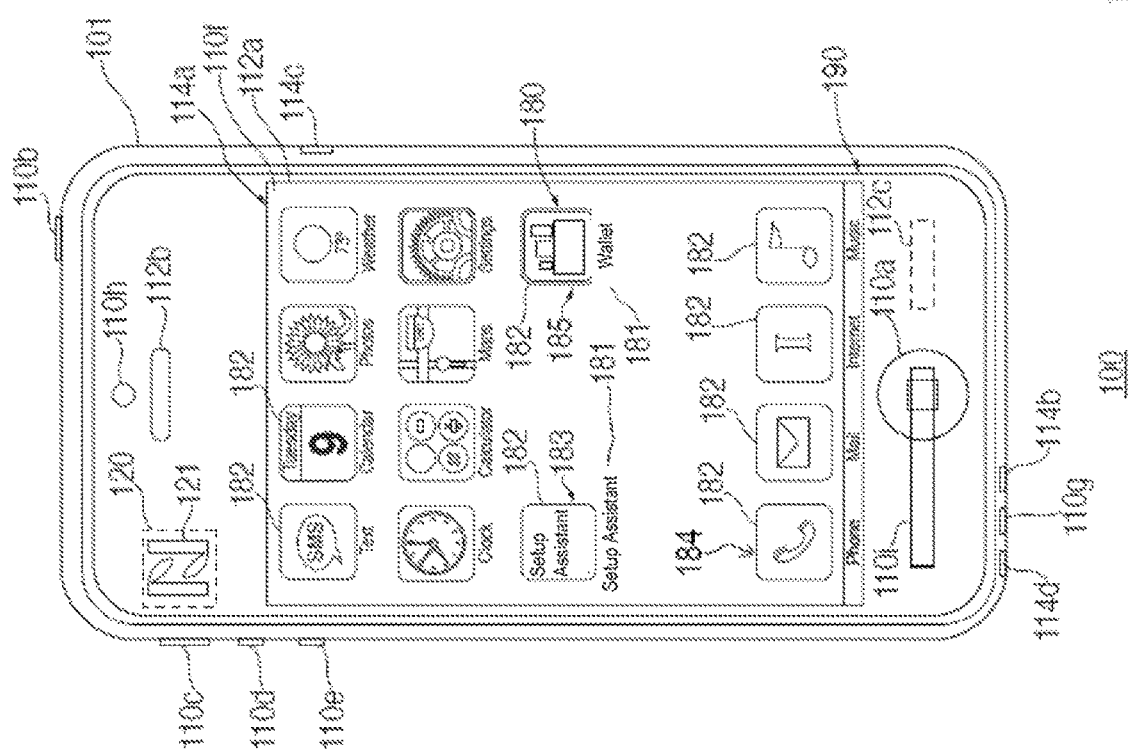
FIG. 3 is a front view of the example electronic device of FIGS. 1 and 2.

As shown in FIG. 3, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180 (e.g., with output information 115o, described below with respect to FIG. 4), which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner according to that application. As another example, when the specific icon 182 labeled with a "Wallet" textual indicator 181 (i.e., specific icon 184) is selected, device 100 may launch or otherwise access a specific "passbook" or "wallet" or "card management" application (e.g., card management application 113m of FIG. 4) and may display screens of a specific user interface that may include one or more tools or features for interacting with device 100 in a specific manner according to that application. In other implementations, electronic device 100 may have a different form factor, such as a wearable device or a tablet.

Referring back to system 1 of FIG. 1, processing subsystem 200 may include a reader or terminal 220 for detecting, reading, or otherwise receiving NFC communication 15 from electronic device 100 and/or for transmitting NFC communication 15 to electronic device 100 (e.g., when electronic device 100 comes within a certain distance or proximity D of terminal 220 (e.g., at a point of sale)). Accordingly, it is noted that NFC communication 15 between terminal 220 and electronic device 100 may occur wirelessly and, as such, may not require a clear "line of sight" between the respective devices. NFC device module 130 may be passive or active. When passive, NFC device module 130 may only be activated when within a response range D of a suitable terminal 220 of processing subsystem 200. For instance, terminal 220 of processing subsystem 200 may emit a relatively low-power radio wave field that may be used to power an antenna utilized by NFC device module 130 (e.g., shared antenna 116 or NFC-specific antenna 134) and, thereby, may enable that antenna to transmit suitable NFC communication information (e.g., credit card credential information) from NFC data module 132, via antenna 116 or antenna 134, to terminal 220 of processing subsystem 200 as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 220 of processing subsystem 200 as NFC communication 15, rather than reflect radio frequency signals, as in the case of a passive NFC device module 130. As also shown in FIG. 1, processing subsystem 200 may also include a processor component 202 that may be the same as or similar to a processor component 102 of electronic device 100, an application 203 that may be operative to control processor component 202, a communications component 206 that may be the same as or similar to a communications component 106 of electronic device 100, an I/O interface 214 that may be the same as or similar to an I/O interface 114 of electronic device 100, a bus 218 that may be the same as or similar to a bus 118 of electronic device 100, a memory component (not shown) that may be the same as or similar to a memory component 104 of electronic device 100, and/or a power supply component (not shown) that may be the same as or similar to a power supply component 108 of electronic device 100.

When NFC component 120 is appropriately enabled and activated to communicate NFC communications 15 with processing subsystem 200 that may include credential data associated with an enabled credential of device 100 (e.g., commerce credential data associated with enabled and activated applet 153a of SSD 154a of NFC component 120), at least a portion of such credential data may be utilized by a credential provisioning subsystem associated with the enabled credential to complete a transaction (e.g., a commercial or financial or other type of transaction between a user of device 100 and processing subsystem 200). For example, a particular credential provisioned on device 100 may be associated with a payment account or loyalty account managed by a credential provisioning subsystem (e.g., a payment network subsystem or an issuing bank subsystem or a loyalty program management subsystem that may assume primary liability for a consumer's capacity or authority to use a credential of that account (e.g., to pay off debts incurred through use of a specific credential). One, some, or each specific credential may be associated with a specific payment or loyalty card that may be electronically linked to an account or accounts of a particular user with the credential provisioning subsystem, such as any suitable credit cards, debit cards, charge cards, stored-value cards, fleet cards, gift cards, loyalty cards, transit passes, and the like.

As shown in FIG. 4, various types of credentials may be stored on electronic device 100, one, some, or each of which may be enabled to provide associated credential data to terminal 220 as a portion of a particular NFC communication 15 for use in executing a transaction with processing subsystem 200 (e.g., in conjunction with a credential provisioning subsystem (e.g., a bank or loyalty management entity or transit entity or otherwise)). For example, at least one credential may be stored as a secure element application ("SE App.") or applet (e.g., a Java card applet instance) on a secure element or memory module 150 of electronic device 100, where each SE App. may be provisioned onto a secure element of device 100 via an administration entity subsystem and/or a credential provisioning subsystem. As shown, for example, both a first SE App. 153a and a second SE App. 153b may be stored on a first secure element 150-1, while both a third SE App. 153c and a fourth SE App. 153d may be stored on a second secure element 150-2. First secure element 150-1 and second secure element 150-2 may be similar types of secure element or may differ from one another in one or more ways. For example, different secure elements may be configured to use different communication bands, different processing speeds, different storage sizes, and/or the like. Additionally or alternatively, at least one credential may be stored as a host-based card emulation application ("HCE App.") on memory 104 or otherwise for use by host processor 102, where each HCE App. may be loaded onto memory 104 of device 100 via the administration entity subsystem (e.g., via an application store of the administration entity subsystem) and/or via a credential provisioning subsystem and/or any other suitable mechanism. As shown, for example, a first HCE App. 113a, a second HCE App. 113b, a third HCE App. 113c, and a fourth HCE App. 113d may be stored on memory 104 or otherwise made accessible for use by processor 102. Each credential (e.g., each SE App. and/or each HCE App.) may include or otherwise be associated with at least one application identifier ("AID") (e.g., pursuant to the ISO/IEC 7816 standard, which may consist of up to 16 bytes of identifying information, and/or which may be a specific type of Dedicated File ("DF") name that may be used in a SELECT command to identify an application). For example, as shown in FIG. 4, HCE App. 113a may include AID-1, HCE App. 113b may include AID-2, HCE App. 113c may include AID-3, HCE App. 113d may include AID-4, SE App. 153a may include AID-5, SE App. 153b may include AID-6, SE App. 153c may include AID-7, and SE App. 153d may include AID-8, any two of which may be the same as one another or different than one another, although it may be advantageous for each AID on device 100 to be unique from each other AID on device 100. For example, an AID may identify a specific card scheme and product, program, or network (e.g., MasterCard Cirrus, Visa PLUS, etc.), where an AID may include not only a registered application provider identifier ("RID") that may be used to identify a payment system (e.g., card scheme) or network (e.g., MasterCard, Visa, etc.) of the credential that may be associated with the AID, but also a proprietary application identifier extension ("PIX") that may be used to differentiate between products, programs, or applications offered by a provider or payment system of the credential that may be associated with the AID. Any suitable specification (e.g., a Java Card specification) that may be operative to preside over firmware of a secure element may be operative to ensure or otherwise force the uniqueness of each AID on the secure element (e.g., each credential instance on a secure element may be associated with its own unique AID).

Application 103 (e.g., an operating system application of device 100) may be operative to support host-based card emulation ("HCE") for enabling an HCE App. running on or otherwise accessible to processor 102 with the ability to offer a credential solution (e.g., an exact virtual representation of an electronic credential identity) without the need for a physical secure element. Moreover, an application 113 accessible to processor 102 of device 100 may include a card management application 113m, which may be any suitable application (e.g., Wallet by Apple Inc., etc.) that may be accessible to processor 102 of device 100 for storing, organizing, and/or utilizing various types of credentials available to device 100 (e.g., transportation boarding passes, event tickets, coupons, store cards, mobile payment cards, loyalty cards, etc.), such as the credentials of HCE Apps. 113a-113d and the credentials of SE Apps. 153a-153d. Card management application 113m may act as a digital wallet (e.g., in conjunction with NFC component 120) for enabling device 100 to present information indicative of one or more credentials or credential options to a user of device 100 (e.g., as output information 115o via I/O interface 114a) and/or to receive associated application input data from a user of device 100 (e.g., as input information 115i via I/O interface 114a). Often, for certain payments, NFC data may be routed by device 100 (e.g., by controller 142 using routing table 199) from processing terminal 220 to an applet on a secure element, while data may be routed by device 100 (e.g., by controller 142 using routing table 199) from processing terminal 220 to an application processor (e.g., a pass or HCE application not on a secure element) for certain HCE communications.

Card management application 113m or any other suitable application or functionality of processor 102 (e.g., application 103 and/or an HCE daemon 103d running on processor 102 that may be registered with one or more of the HCE Apps. of card management application 113m) and/or controller 142 of NFC component 120 may be operative to generate, update, and/or otherwise manage a data structure or routing table 199 that may be leveraged for determining how controller 142 may route data (e.g., commands) received by controller 142 from processing subsystem 200 (e.g., from terminal 220 as communication 15). As shown, routing table 199 may be stored in a memory component 142m (e.g., non-volatile memory) of controller 142 and/or as a portion of memory 104 (e.g., as a portion of an application accessible to processor 102). For example, as shown in FIG. 6, and as described in more detail below with respect to process 500 of FIG. 5, routing table or data structure 199 may include one or more rules or entries 191 (e.g., rules 191-1 through 191-9). Each rule 191 may include a specific match element 192, which may be operative to be matched or otherwise associated with certain data received by controller 142 (e.g., from terminal 220 (e.g., via antenna 134 as at least a portion of data 15)). Each rule 191 may also include at least a first priority destination identification 193 that may identify a destination to which certain data received by controller 142 and matched with a match element of that rule may be routed. Some rules may include at least a first priority destination identification 193 and at least one lower second priority destination identification 194. Some rules may include three or more destination identifications, each of different priority. Each one of such destination identifications (or destinations, as may be referred to herein for short) of differing priorities may be operative to identify a different destination of device 100 that may be operative to store one or more credentials (e.g., first secure element 150-1, second secure element 150-2, application processor 102, and/or any other suitable destination). Any destination on device 100 may be identified with any priority for any rule of table 199.

Certain subsets of rules 191 of routing table 199 may be associated with different routing mechanisms (e.g., AID based routing, protocol based routing, and technology based routing, as may be described by the NFC Forum (e.g., in the NFCForum-TS-NCI-1.0 Technical Specification of Nov. 6, 2012)). For example, certain rules 191 of structure 199 may be associated with an AID based routing subset 195, where the match element 192 of such rules may be a specific AID (e.g., AID based routing subset 195 may include rule 191-1 with a particular AID-X as its match element 192, rule 191-2 with a particular AID-Y as its match element 192, and rule 191-3 with a particular AID-Z as its match element 192). Each one of AID-X, AID-Y, and AID-Z of routing table 199 may be unique, and each one may be the same as one or more of AID-1 through AID-8 of device 100 of FIG. 4. When routing table 199 is able to be updated, one or more additional AIDs may be added to table 199 and/or one or more AIDs may be removed from table 199 (e.g., based on any new AIDs being added to device 100 or previously added AIDs being removed from device 100), although this disclosure may provide processes by which routing table 199 need not be updated frequently (e.g., upon every addition or removal of a pass) while still enabling efficient functionality. Therefore, processes of this disclosure may obviate the need to update table 199 every time a new applet or pass is added to device 100 (e.g., when a new applet added to a secure element of device 100 and/or when a new pass or HCE application is added to device 100 (e.g., off of a secure element)) and/or every time an applet or pass is removed from device 100. Additionally or alternatively, certain rules 191 of structure 199 may be associated with a protocol based routing subset 196, where the match element 192 of such rules may be associated with a specific protocol. For example, protocol based routing subset 196 may include rule 191-4 that may use a SELECT AID command that may not match a registered AID (e.g., an AID of subset 195) as its match element 192. Further, protocol based routing subset 196 may include a rule 191-5 that may be provided with an ISODEP frame as its match element 192. Still further, protocol based routing subset 196 may include a rule 191-6 that may be provided with an NFCDEP frame as its match element 192. Additionally or alternatively, certain rules 191 of structure 199 may be associated with a technology based routing subset 197, where the match element 192 of such rules may be associated with a specific technology (e.g., technology based routing subset 197 may include rule 191-7 with a TYPE A technology as its match element 192, rule 191-8 with a TYPE B technology as its match element 192, and rule 191-9 with a TYPE F technology as its match element 192). Data structure 199 may be any suitable database or any suitable ordered data storage that may be accessible in any suitable way to system 1 (e.g., to controller 142).

An AID based routing subset of a routing table may typically be updated whenever a new SE App. or a new HCE App. is added to device 100 (e.g., by adding a rule with that App.'s AID) and/or whenever an SE App. or an HCE App. is removed from device 100 (e.g., by removing a rule with that App.'s AID). However, such a process may be time consuming and/or may require a large routing table that may tax a limited memory of controller 142 (e.g., memory 142*m* of controller 142 may only support a routing table with up to a certain amount of entries or rules (e.g., 50 entries)). Therefore, by configuring routing table 199 to include multiple destinations of different priorities for certain rules, the size of routing table 199 may be reduced and/or the frequency with which table 199 is updated may be reduced. For example, only a limited subset of known AIDs may be included in AID based routing subset 195 rather than including every AID available on device 100. Any suitable portion of device 100, such as application 113 or HCE daemon 103*d* may be operative to determine a type of a particular AID of device 100 that may have an associated entry added to routing table 199 and may also be operative to determine one or more priorities for such an AID type and the order of priorities if there are two or more priorities for such an AID type such that table 199 may be updated on device 100 (e.g., table 199 may be updated on application 103 and such an update may then be shared with controller 142). Any update to table 199 may occur at any suitable time, such as after a device shutdown or restore or after an applet is added to or removed from device 100 or after a SIM is coupled to device 100 and/or the like. When a new AID is determined by device 100 to have the same set of priorities as that of rule 191-4, then a new specific rule for that new AID may not be added to table 199 (e.g., an AID with a first priority of a first secure element and a second priority of the application processor), yet when a new AID is determined by device 100 to have a different priority or different set of priorities than rule 191-4, then a new specific rule for that new AID may be added to table 199 (e.g., an AID with a first priority of the application processor and a second priority of a secure element or no second priority, or an AID with a first priority of a second secure element and a second priority of any type or no second priority, or an AID with a first priority of the first secure element and a second priority of a second secure element or no second priority, or the like that may be different than the priorities of rule 191-4). The ISO/IEC 7816 standard may provide a defined error code when an AID is not properly routed such that device 100 may be operative to determine when a first priority routing has failed and then to attempt routing according to a second priority for that AID (e.g., a particular error code may be returned to controller 142 when a first priority routing attempt fails for an AID such that controller 142 may be operative to determine if any second priority routing is defined and then attempt to route the AID according to that second priority routing).

Figure 5:
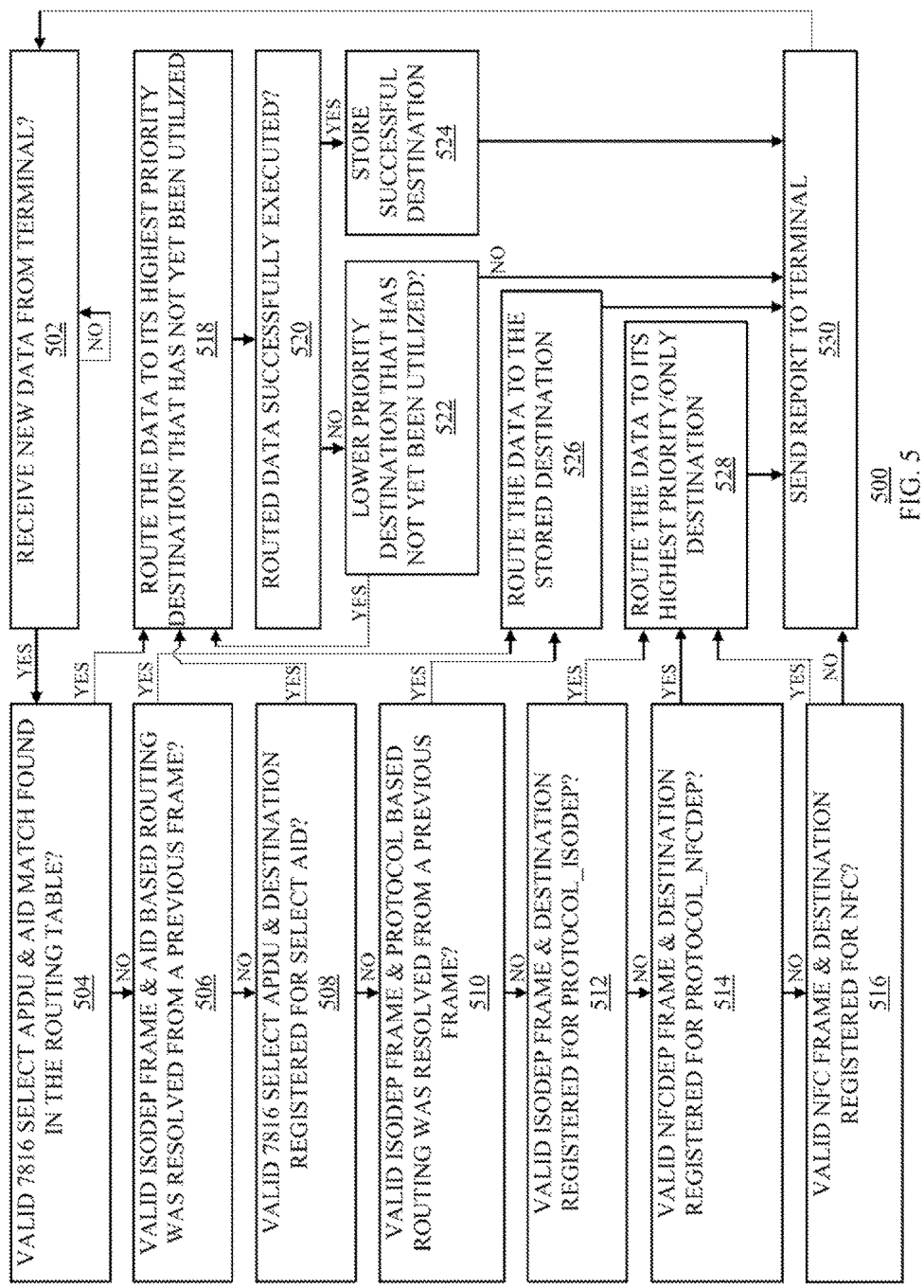
FIG. 5 is a flowchart of an illustrative process for priority based routing of data on an electronic device.

FIG. 5 is a flowchart of an illustrative process 500 for conducting priority based routing on an electronic device of data received from a processing subsystem. Process 500 may be described as being implemented by various elements of system 1 of FIGS. 1-4 and 6 (e.g., electronic device 100, processing subsystem 200, etc.). However, it is to be understood that process 500 may be implemented using any other suitable components or subsystems. Process 500 may provide an NFC controller of an electronic device with the ability to effectively route data from a processing terminal to an appropriate destination on the electronic device (e.g., through use of a routing table with multiple destinations of different priorities for at least a certain type of received data to be routed). In some implementations, the routing table may be limited in size and/or may be only periodically updated, if at all.

Process 500 may begin at step 502, where it may be determined whether new data suitable for routing, such as a select command, has been received by an electronic device. For example, NFC controller 142 may be operative to determine whether new data suitable for routing has been received at electronic device 100 from terminal 220 (e.g., via antenna 134 as a communication 15). If no such new data has been received, the process 500 may repeat step 502. When such new data has been received, process 500 may advance to step 504, where it may be determined whether such received data is a valid SELECT command (e.g., a valid SELECT application protocol data unit ("APDU") command as may be defined by the ISO/IEC 7816 standard) and, if so, whether such a valid SELECT command specifies an AID (e.g., as DF name of the command) that is also found in an accessible routing table of the electronic device. For example, NFC controller 142 may be operative to determine whether new data suitable for routing as received at electronic device 100 from terminal 220 is a valid SELECT command that specifies an AID that is also included as a match element 192 of a rule 191 of routing table 199. If the new data is determined at step 504 not to be a valid SELECT command or to be a valid SELECT command that does not specify an AID found in an accessible routing table, then process 500 may advance from step 504 to step 506.

However, if the new data is determined at step 504 to be a valid SELECT command that does specify an AID found in an accessible routing table, then process 500 may advance from step 504 to step 518, where the new data may be routed to the highest priority destination that is associated in the routing table with the specified AID of the new data and that has not yet been utilized for routing the new data (e.g., the first priority destination of the rule in the routing table associated with the specified AID of the new data). After such routing of step 518, process 500 may advance to step 520, where it may be determined whether the routing of step 518 was successfully executed (e.g., the ISO/IEC 7816 standard may provide a defined error code when an AID is not properly routed such that device 100 (e.g., controller 142) may be operative to determine when a first priority routing has failed)). If the routing of step 518 is determined at step 520 to not have been successfully executed (e.g., because the destination of the routing attempt does not include an applet with an AID that matches the AID of the new data attempted to be routed, or for any other suitable reason), then process 500 may advance from step 520 to step 522, where it may be determined whether there is another destination that is associated in the routing table with the specified AID of the new data (e.g., of the received command) and that is of a lower priority (e.g., next highest priority) than the destination just utilized at step 518 and that has not yet been utilized for routing the new data. If it is determined at step 522 that there is no not yet utilized lower priority destination associated in the routing table with the specified AID of the new data, then process 500 may advance from step 522 to step 530, where the unsuccessful routing of the new data may be reported by the electronic device to the terminal and then process 500 may advance from step 530 to step 502 where it may be determined whether any new data suitable for routing has been received by the electronic device. However, if it is determined at step 522 that there is another destination that is associated in the routing table with the specified AID of the new data and that is of a lower priority than the destination just utilized at step 518 and that has not yet been utilized for routing the new data, then process 500 may advance from step 522 back to step 518, where the new data may be routed to the highest priority destination that is associated in the routing table with the specified AID of the new data and that has not yet been utilized for routing the new data (e.g., the destination with the priority just below the priority of the destination utilized for the same data at the previous iteration of step 518 (i.e., the second priority destination 194 if the first priority destination 193 was used in the last attempt)). If the routing of step 518 is determined at step 520 to have been successfully executed (e.g., because the destination of the routing attempt does include an applet with an AID that matches the AID of the new data attempted to be routed, or for any other suitable reason), then process 500 may advance from step 520 to step 524, where the destination of the successfully executed routing may be stored for later use (e.g., the identity of the applet or secure element or processor or AID or otherwise of the destination to which data was successfully routed at step 518), and then process 500 may advance from step 524 to step 530, where the successful routing of the new data may be reported by the electronic device to the terminal and then process 500 may advance from step 530 to step 502 where it may be determined whether any new data suitable for routing has been received by the electronic device. The destination of the successfully executed routing may be stored at step 524 such that the rest of the communications associated with the current transaction may be automatically routed to that same destination (e.g., the routing process may be performed at the beginning of the process, and the same destination may then be used for the remainder of the process (see, e.g., step 526)). If a rule only has one priority destinations, then the first priority destination (e.g., of first priority destination 193) may also be referred to herein as the highest priority destination, and if a rule only has two priority destinations, then the first priority destination (e.g., of first priority destination 193) may also be referred to herein as the highest priority destination and the second priority destination (e.g., of second priority destination 194) may also be referred to herein as the lowest priority destination or the next highest priority destination after the highest priority destination, and if a rule has three priority destinations, then the first priority destination (e.g., of first priority destination 193) may also be referred to herein as the highest priority destination and the second priority destination (e.g., of second priority destination 194) may also be referred to herein as the next highest priority destination after the highest priority destination and the third priority destination (not shown in table 199 of FIG. 6) may also be referred to herein as the lowest priority destination or the next highest priority destination after the next highest priority destination after the highest priority destination, and so on.

As a first example, if NFC controller 142 determines that new data suitable for routing received at electronic device 100 from terminal 220 is a valid SELECT command that specifies an AID of AID-X, and if NHC controller 142 determines that the specified AID-X is also included as a match element 192 of rule 191-1 of routing table 199 (e.g., at step 504), then NFC controller 142 may be operative to route that new data (e.g., at step 518) to the highest priority destination associated with that rule 191-1 that has not yet been utilized for routing that new data (e.g., first secure element 150-1). If such routing of the new data from NFC controller 142 to first secure element 150-1 (e.g., as data 552 of FIG. 4 over a connection between controller 142 and secure element 150-1 that may leverage a single wire protocol ("SWP") or a dual wire protocol ("DWP") or any other suitable protocol) is successfully executed, as may be determined by NFC controller 142 (e.g., based on any suitable response or no response from first secure element 150-1 (e.g., at step 520)), then NFC controller 142 may be operative to store any suitable information indicative of the destination of the successfully executed routing (e.g., of first secure element 150-1) for later use (e.g., in any suitable register or memory portion 142r of memory 142m or otherwise that may be accessible to NFC controller 142 (e.g., at step 524)) and may then send a report of such a successfully executed new data routing to terminal 220 (e.g., via antenna 134 as a communication 15 (e.g., at step 530)) before then determining whether any new data suitable for routing has been received at electronic device 100 from terminal 220 (e.g., at step 502). However, if such routing of the new data from NFC controller 142 to first secure element 150-1 is determined not to be successfully executed, then NFC controller 142 may be operative to determine whether there is another destination that is associated in routing table 199 with rule 191-1 for AID-X of the new data command that is of a lower priority than the destination just utilized (e.g., of a lower priority than first secure element 150-1 as first priority destination 193 of rule 191-1) and that has not yet been utilized for routing the new data (e.g., at step 522). If no such lower priority destination is discovered by NFC controller 142 (e.g., at step 522), then NFC controller 142 may be operative to send a report of such an unsuccessful new data routing to terminal 220 (e.g., via antenna 134 as a communication 15 (e.g., at step 530)) before then determining whether any new data suitable for routing has been received at electronic device 100 from terminal 220 (e.g., at step 502). However, if such a lower priority destination is determined by NFC controller 142 (e.g., at step 522), then NFC controller 142 may be operative to route the new data (e.g., at another iteration of step 518) to that lower priority destination (e.g., to application processor 102 as second priority destination 194 of rule 191-1 (e.g., as data 554 of FIG. 4 over a connection between controller 142 and application processor 102 that may leverage a universal asynchronous receiver/transmitter ("UART") or any other suitable mechanism)).

As another example, if NFC controller 142 determines that new data suitable for routing received at electronic device 100 from terminal 220 is a valid SELECT command that specifies an AID of AID-Y, and if NFC controller 142 determines that the specified AID-Y is also included as a match element 192 of rule 191-2 of routing table 199 (e.g., at step 504), then NFC controller 142 may be operative to route that new data (e.g., at step 518) to the highest priority destination associated with that rule 191-2 that has not yet been utilized for routing that new data (e.g., first secure element 150-1). If such routing of the new data from NFC controller 142 to first secure element 150-1 (e.g., as data 552 of FIG. 4 over a connection between controller 142 and secure element 150-1 that may leverage a single wire protocol ("SWP") or a dual wire protocol ("DWP") or any other suitable protocol) is successfully executed, as may be determined by NFC controller 142 (e.g., based on any suitable response or no response from first secure element 150-1 (e.g., at step 520)), then NFC controller 142 may be operative to store any suitable information indicative of the destination of the successfully executed routing (e.g., of first secure element 150-1) for later use (e.g., in any suitable register or memory portion 142r of memory 142m or otherwise that may be accessible to NFC controller 142 (e.g., at step 524)) and may then send a report of such a successfully executed new data routing to terminal 220 (e.g., via antenna 134 as a communication 15 (e.g., at step 530)) before then determining whether any new data suitable for routing has been received at electronic device 100 from terminal 220 (e.g., at step 502). However, if such routing of the new data from NFC controller 142 to first secure element 150-1 is determined not to be successfully executed, then NFC controller 142 may be operative to determine whether there is another destination that is associated in routing table 199 with rule 191-2 for AID-Y of the new data command that is of a lower priority than the destination just utilized (e.g., of a lower priority than first secure element 150-1 as first priority destination 193 of rule 191-2) and that has not yet been utilized for routing the new data (e.g., at step 522). If no such lower priority destination is discovered by NFC controller 142 (e.g., at step 522), then NFC controller 142 may be operative to send a report of such an unsuccessful new data routing to terminal 220 (e.g., via antenna 134 as a communication 15 (e.g., at step 530)) before then determining whether any new data suitable for routing has been received at electronic device 100 from terminal 220 (e.g., at step 502). This may occur, for example, when there is no defined second priority destination 194 of rule 191-2, as shown in table 199 of FIG. 6. However, if such a lower priority destination is determined by NFC controller 142 (e.g., at step 522), then NFC controller 142 may be operative to route the new data (e.g., at another iteration of step 518) to that lower priority destination.

As just one other example, if NFC controller 142 determines that new data suitable for routing as received at electronic device 100 from terminal 220 is a valid SELECT command that specifies an AID of AID-Z, and if NFC controller 142 determines that that specified AID-Z is also included as a match element 192 of rule 191-3 of routing table 199 (e.g., at step 504), then NFC controller 142 may be operative to route that new data (e.g., at step 518) to the highest priority destination associated with that rule 191-3 that has not yet been utilized for routing that new data (e.g., application processor 102). If such routing of the new data from NFC controller 142 to application processor 102 (e.g., as data 554 of FIG. 4) is successfully executed, as may be determined by NFC controller 142 (e.g., based on any suitable response or no response from application processor 102 (e.g., at step 520)), then NFC controller 142 may be operative to store any suitable information indicative of the destination of the successfully executed routing (e.g., of application processor 102) for later use (e.g., in any suitable register or memory portion 142r of memory 142m or otherwise that may be accessible to NFC controller 142 (e.g., at step 524)) and may then send a report of such a successfully executed new data routing to terminal 220 (e.g., via antenna 134 as a communication 15 (e.g., at step 530)) before then determining whether any new data suitable for routing has been received at electronic device 100 from terminal 220 (e.g., at step 502). However, if such routing of the new data from NFC controller 142 to application processor 102 is determined not to be successfully executed, then NFC controller 142 may be operative to determine whether there is another destination that is associated in routing table 199 with rule 191-3 for AID-Z of the new data command that is of a lower priority than the destination just utilized (e.g., of a lower priority than application processor 102 as first priority destination 193 of rule 191-3) and that has not yet been utilized for routing the new data (e.g., at step 522). If no such lower priority destination is discovered by NFC controller 142, then NFC controller 142 may be operative to send a report of such an unsuccessful new data routing to terminal 220 (e.g., via antenna 134 as a communication 15 (e.g., at step 530)) before then determining whether any new data suitable for routing has been received at electronic device 100 from terminal 220 (e.g., at step 502). However, if such a lower priority destination is discovered by NFC controller 142, then NFC controller 142 may be operative to route the new data (e.g., at another iteration of step 518) to that discovered destination (e.g., to first secure element 150-1 as second priority destination 194 of rule 191-3 (e.g., as data 552 of FIG. 4), as shown in table 199 of FIG. 6).

If new data received at step 502 is determined at step 504 not to be a valid SELECT command or to be a valid SELECT command that does not specify an AID found in an accessible routing table, then process 500 may advance from step 504 to step 506, where it may be determined whether such received new data is a valid ISODEP frame and, if so, whether AID based routing was resolved from a previous frame. For example, NFC controller 142 may be operative to determine whether new data suitable for routing as received at electronic device 100 from terminal 220 is a valid ISODEP frame and, if so, whether the routing of a previous frame of routable data received by controller 142 from terminal 220 was resolved by a rule 191 of routing table 199 that is associated with AID based routing subset 195 (e.g., whether the routing of a previous frame of routable data was resolved using one of rules 191-1, 191-2, or 191-3, such as described above), which may be accomplished in any suitable manner (e.g., through use of a destination stored or otherwise indicated by step 524). If it is determined at step 506 that the new data is not a valid ISODEP frame or that the new data is a valid ISODEP frame but that AID based routing was not resolved from a previous frame, then process 500 may advance from step 506 to step 508, which may be described below.

However, if it is determined at step 506 that the new data is a valid ISODEP frame and that AID based routing was resolved from a previous frame, then process 500 may advance from step 506 to step 526, where the new data may be routed to the same destination as the previous frame (e.g., to the destination stored at step 524). Any destination stored at step 524 may be cleared any time step 518 is carried out, such that such a destination may only be stored and utilized by process 500 for a particular valid SELECT command and any associated following valid ISODEP frames. After such routing of step 526, process 500 may advance from step 526 to step 530, where that routing of step 526 may be reported by the electronic device to the terminal and then process 500 may advance from step 530 to step 502 where it may be determined whether any new data suitable for routing has been received by the electronic device. For example, if after NFC controller 142 determines that first new data suitable for routing as received at electronic device 100 from terminal 220 is a valid SELECT command that specifies an AID that is also included as a match element 192 of a rule 191 of AID based routing subset 195 and then routes that data to at least one priority destination of that rule where such destination is eventually stored (e.g., at one or more possible paths from step 504 to step 518 and eventually through steps 524 and 530), NFC controller 142 may then determine that second new data received after such first new data is a valid ISODEP frame (e.g., at step 506), and then NFC controller 142 may be operative to route that second new data (e.g., at step 526) to the destination stored (e.g., at step 524) with respect to the prior routing of the first data (e.g., the valid SELECT command data).

However, if it is determined at step 506 that the new data is not a valid ISODEP frame or that the new data is a valid ISODEP frame but that AID based routing was not resolved from a previous frame (e.g., there is currently no stored destination at a memory location utilized by step 524), then process 500 may advance from step 506 to step 508, where it may be determined whether such new data is a valid SELECT command (e.g., a valid 7816 SELECT ADDU) and, if so, whether a target is registered for SELECT AID (e.g., in an accessible routing table of the electronic device). For example, NFC controller 142 may be operative to determine whether the new data suitable for routing as received at electronic device 100 from terminal 220 is a valid SELECT command and, if so, whether 7816 SELECT AID is included as a match element 192 of a rule 191 of routing table 199. If the new data is determined at step 508 not to be a valid SELECT command or to be a valid SELECT command but that a target is not registered for SELECT AID, then process 500 may advance from step 508 to step 510, which may be described below.

However, if it is determined at step 508 that the new data is a valid SELECT command and that a target is registered for SELECT AID (e.g., in an accessible routing table of the electronic device) or that the valid SELECT command specifies an AID (e.g., as DF name of the command) that is not also found in routing table 199 (e.g., the valid SELECT command specifies an AID that is not specifically included as a match element 192 of a rule 191 of AID based routing subset 195 of routing table 199), then process 500 may advance from step 508 to step 518, where the new data may be routed to the highest priority destination that is associated in the routing table with SELECT AID and that has not yet been utilized for routing the new data. As described above, after such routing of step 518, process 500 may advance to step 520, where it may be determined whether the routing of step 518 was successfully executed. If the routing of step 518 is determined at step 520 to not have been successfully executed, then process 500 may advance from step 520 to step 522, where it may be determined whether there is another destination that is associated in the routing table with SELECT AID and that is of a lower priority than the destination just utilized at step 518 and that has not yet been utilized for routing the new data. If it is determined at step 522 that there is no not yet utilized lower priority destination associated in the routing table with SELECT AID, then process 500 may advance from step 522 to step 530, where the unsuccessful routing of the new data may be reported by the electronic device to the terminal and then process 500 may advance from step 530 to step 502 where it may be determined whether any new data suitable for routing has been received by the electronic device. However, if it is determined at step 522 that there is another destination that is associated in the routing table with SELECT AID and that is of a lower priority than the destination just utilized at step 518 and that has not yet been utilized for routing the new data, then process 500 may advance from step 522 back to step 518, where the new data may be routed to the highest priority destination that is associated in the routing table with SELECT AID and that has not yet been utilized for routing the new data (e.g., the destination with the priority just below the priority of the destination utilized for the same data at the previous iteration of step 518). If the routing of step 518 is determined at step 520 to have been successfully executed, then process 500 may advance from step 520 to step 524, where the destination of the successfully executed routing may be stored for later use, and then process 500 may advance from step 524 to step 530, where the successful routing of the new data may be reported by the electronic device to the terminal and then process 500 may advance from step 530 to step 502 where it may be determined whether any new data suitable for routing has been received by the electronic device.

As an example, if NFC controller 142 determines that new data suitable for routing as received at electronic device 100 from terminal 220 is a valid SELECT command and if NFC controller 142 determines that the valid SELECT command specifies an AID that is not specifically included as a match element 192 of a rule 191 of routing table 199 (e.g., the valid SELECT command specifies an AID that is not specifically included as a match element 192 of a rule 191 of AID based routing subset 195 of routing table 199) and/or that SELECT AID is included as a match element 192 of a rule (e.g., rule 191-4) of routing table 199 (e.g., at step 508), then NFC controller 142 may be operative to route that new data (e.g., at step 518) to the highest priority destination associated with a SELECT AID rule (e.g., rule 191-4) that has not yet been utilized for routing that new data (e.g., first secure element 150-1). If such routing of the new data from NFC controller 142 to first secure element 150-1 (e.g., as data 552 of FIG. 4) is successfully executed, as may be determined by NFC controller 142 (e.g., based on any suitable response or no response from first secure element 150-1 (e.g., at step 520)), then NFC controller 142 may be operative to store any suitable information indicative of the destination of the successfully executed routing (e.g., of first secure element 150-1) for later use (e.g., in any suitable register or memory portion 142r of memory 142m or otherwise that may be accessible to NFC controller 142 (e.g., at step 524)) and may then send a report of such a successfully executed new data routing to terminal 220 (e.g., via antenna 134 as a communication 15 (e.g., at step 530)) before then determining whether any new data suitable for routing has been received at electronic device 100 from terminal 220 (e.g., at step 502). However, if such routing of the new data from NFC controller 142 to first secure element 150-1 is determined not to be successfully executed, then NFC controller 142 may be operative to determine whether there is another destination that is associated in routing table 199 with rule 191-4 for SELECT AID that is of a lower priority than the destination just utilized (e.g., of a lower priority than first secure element 150-1 as first priority destination 193 of rule 191-4) and that has not yet been utilized for routing the new data (e.g., at step 522). If no such lower priority destination is discovered by NFC controller 142, then NFC controller 142 may be operative to send a report of such an unsuccessful new data routing to terminal 220 (e.g., via antenna 134 as a communication 15 (e.g., at step 530)) before then determining whether any new data suitable for routing has been received at electronic device 100 from terminal 220 (e.g., at step 502). However, if such a lower priority destination is discovered by NFC controller 142, then NFC controller 142 may be operative to route the new data (e.g., at another iteration of step 518) to that discovered destination (e.g., to application processor 102 as second priority destination 194 of rule 191-4 (e.g., as data 554 of FIG. 4), as shown in table 199 of FIG. 6).

If new data received at step 502 is determined at step 508 not to be a valid SELECT command or to be a valid SELECT command but that a target is not registered for SELECT AID, then process 500 may advance from step 508 to step 510, where it may be determined whether such received new data is a valid ISODEP frame and, if so, whether protocol based routing was resolved from a previous frame. For example, NFC controller 142 may be operative to determine whether new data suitable for routing as received at electronic device 100 from terminal 220 is a valid ISODEP frame and, if so, whether the routing of a previous frame of routable data received by controller 142 from terminal 220 was resolved by a rule 191 of routing table 199 that is associated with protocol based routing subset 196 (e.g., whether the routing of a previous frame of routable data was resolved using one of rules 191-4, 191-5, or 191-6, such as rule 191-4 associated with SELECT AID described above), which may be determined in any suitable manner (e.g., a flag or register may be set (e.g., at step 524) when a previous frame of routable data was resolved using a rule and cleared when not, where the value of such a flag or register may be determined at step 510 (e.g., like at step 506)). If it is determined at step 510 that the new data is not a valid ISODEP frame or that the new data is a valid ISODEP frame but that protocol based routing was not resolved from a previous frame, then process 500 may advance from step 510 to step 512, which may be described below.

However, if it is determined at step 510 that the new data is a valid ISODEP frame and that protocol based routing was resolved from a previous frame, then process 500 may advance from step 510 to step 526, where the new data may be routed to the same destination as the previous frame (e.g., to the destination stored at step 524). After such routing of step 526, process 500 may advance from step 526 to step 530, where that routing of step 526 may be reported by the electronic device to the terminal and then process 500 may advance from step 530 to step 502 where it may be determined whether any new data suitable for routing has been received by the electronic device. For example, if after NFC controller 142 determines that first new data suitable for routing as received at electronic device 100 from terminal 220 is a valid SELECT command and that SELECT AID is included as a match element 192 of rule 191-4 of protocol based subset 196 of routing table 199 and then routes that data to at least one priority destination of that rule where such destination is eventually stored (e.g., at one or more possible paths from step 508 to step 518 and eventually through steps 524 and 530). NFC controller 142 may then determine that second new data received after such first new data is a valid ISODEP frame (e.g., at step 510), and then NFC controller 142 may be operative to route that second new data (e.g., at step 526) to the destination stored (e.g., at step 524) with respect to the prior routing of the first data (e.g., the valid SELECT command data).

However, if it is determined at step 510 that the new data is not a valid ISODEP frame or that the new data is a valid ISODEP frame but that protocol based routing was not resolved from a previous frame (e.g., there is currently no stored destination or no flag or register set at a memory location utilized by step 524), then process 500 may advance from step 510 to step 512, where it may be determined whether such new data is a valid ISODEP frame and, if so, whether a target is registered for PROTOCOL_ISODEP (e.g., in an accessible routing table of the electronic device). For example, NFC controller 142 may be operative to determine whether the new data suitable for routing as received at electronic device 100 from terminal 220 is a valid ISODEP frame and if so, whether PROTOCOL_I-SODEP is included as a match element 192 of a rule 191 of routing table 199 (e.g., a data exchange protocol ("DEP") that may be using ISO as a DEP). For example, a valid ISODEP frame may be a valid frame of an ISO-DEP protocol (e.g., a half-duplex block transmission protocol that may be defined in Section 13 of the NFC Digital Protocol Technical Specification of NFC Forum, DIGITAL 1.0, NFC-Forum-TS-DigitalProtocol-1.0 of Nov. 17, 2010, and may be based on ISO/IEC_14443 and/or EMV_CLESS). If the new data is determined at step 512 not to be a valid ISODEP frame or if the new data is determined at step 512 to be a valid ISODEP frame but that a target is not registered for PROTOCOL_ISODEP, then process 500 may advance from step 512 to step 514, which may be described below.

However, if it is determined at step 512 that the new data is a valid ISODEP frame and that a target is registered for PROTOCOL_ISODEP (e.g., in an accessible routing table of the electronic device), then process 500 may advance from step 512 to step 528, where the new data may be routed to the highest priority destination that is associated in the routing table with PROTOCOL_ISODEP and that has not yet been utilized for routing the new data (or the only destination that is associated in the routing table with PROTOCOL_ISODEP if multiple priorities are not provided in the routing table with PROTOCOL_ISODEP), after which process 500 may advance to step 530, where such routing of the new data may be reported by the electronic device to the terminal and then process 500 may advance from step 530 to step 502 where it may be determined whether any new data suitable for routing has been received by the electronic device. For example, NFC controller 142 may be operative to determine that the new data is a valid ISODEP frame and that PROTOCOL_ISODEP is included as a match element 192 of rule 191-5 of routing table 199 (e.g., at step 512) and may then route that new data (e.g., at step 528) to first secure element 150-1 as the first priority destination 193 of that rule 191-5 (e.g., as data 552 of FIG. 4).

If the new data is determined at step 512 not to be a valid ISODEP frame or to be a valid ISODEP frame but that a target is not registered for PROTOCOL_ISODEP, then process 500 may advance from step 512 to step 514, where it may be determined whether such new data is a valid NFCDEP frame and, if so, whether a target is registered for PROTOCOL_NFCDEP (e.g., in an accessible routing table of the electronic device). For example, NFC controller 142 may be operative to determine whether the new data suitable for routing as received at electronic device 100 from terminal 220 is a valid NFCDEP frame and, if so, whether PROTOCOL_NFCDEP is included as a match element 192 of a rule 191 of routing table 199 (e.g., a DEP that may be using NFC as a DEP). For example, a valid NFCDEP frame may be a valid frame of an NFC-DEP protocol (e.g., a half-duplex block transmission protocol that may be defined in Section 14 of the NFC Digital Protocol Technical Specification of NFC Forum, DIGITAL 1.0, NFCForum-TS-DigitalProtocol-1.0 of Nov. 17, 2010, and may be based on ISO/IEC_18092). If the new data is determined at step 514 not to be a valid NFCDEP frame or to be a valid NFCDEP frame but that a target is not registered for PROTOCOL_NFCDEP, then process 500 may advance from step 514 to step 516, which may be described below.

However, if it is determined at step 514 that the new data is a valid NFCDEP frame and that a target is registered for PROTOCOL_NFCDEP (e.g., in an accessible routing table of the electronic device), then process 500 may advance from step 514 to step 528, where the new data may be routed to the highest priority destination that is associated in the routing table with PROTOCOL_NFCDEP and that has not yet been utilized for routing the new data (or the only destination that is associated in the routing table with PROTOCOL_NFCDEP if multiple priorities are not provided in the routing table with PROTOCOL_ISODEP), after which process 500 may advance to step 530, where such routing of the new data may be reported by the electronic device to the terminal and then process 500 may advance from step 530 to step 502 where it may be determined whether any new data suitable for routing has been received by the electronic device. For example, NFC controller 142 may be operative to determine that the new data is a valid NFCDEP frame and that PROTOCOL_NFCDEP is included as a match element 192 of rule 191-6 of routing table 199 (e.g., at step 514) and may then route that new data (e.g., at step 528) to application processor 102 as the first priority destination 193 of that rule 191-6 (e.g., as data 554 of FIG. 4).

If the new data is determined at step 514 not to be a valid NFCDEP frame or to be a valid NFCDEP frame but that a target is not registered for PROTOCOL_NFCDEP, then process 500 may advance from step 514 to step 516, where it may be determined whether such new data is a valid NFC frame (e.g., uses a particular type of NFC technology) and, if so, whether a target is registered for the particular technology type of that valid NFC frame (e.g., in an accessible routing table of the electronic device). For example, NFC controller 142 may be operative to determine whether the new data suitable for routing as received at electronic device 100 from terminal 220 is a valid NFC frame and, if so, whether the particular technology type (e.g., Type A, Type B, Type F, etc.) of that valid NFC frame is included as a match element 192 of a rule 191 of routing table 199. If the new data is determined at step 516 not to be a valid NFC frame or to be a valid NFC frame but that a target is not registered for the particular technology type of that valid NFC frame, then process 500 may advance from step 516 to step 530, where it may be reported by the electronic device to the terminal that the new data was not successfully routed for execution and then process 500 may advance from step 530 to step 502 where it may be determined whether any new data suitable for routing has been received by the electronic device.

However, if it is determined at step 516 that the new data is a valid NFC frame and that a target is registered for the particular technology type of that valid NFC frame (e.g., in an accessible routing table of the electronic device), then process 500 may advance from step 516 to step 528, where the new data may be routed to the highest priority destination that is associated in the routing table with the particular technology type of that valid NFC frame and that has not yet been utilized for routing the new data (or the only destination that is associated in the routing table with the particular technology type of that valid NFC frame if multiple priorities are not provided in the routing table for the particular technology type of that valid NFC frame), after which process 500 may advance to step 530, where such routing of the new data may be reported by the electronic device to the terminal and then process 500 may advance from step 530 to step 502 where it may be determined whether any new data suitable for routing has been received by the electronic device. For example, NFC controller 142 may be operative to determine that the new data is a valid NFC frame and that the particular technology type of that valid NFC frame is Type F that is included as a match element 192 of rule 191-9 of routing table 199 (e.g., at step 516) and may then route that new data (e.g., at step 528) to second secure element 150-2 as the first priority destination 193 of that rule 191-9 (e.g., as data 556 of FIG. 4 over a connection between controller 142 and secure element 150-2 that may leverage SWP or DWP or any other suitable protocol).

It is the be understood that each one of AID-X, AID-Y, and AID-Z of table 199 may be the same as the AID of one or more of the credential applications available on device 100 (e.g., one or more of AID-1 through AID-8), where each credential application associated with AIDs represented by one or more rules 191 of AID protocol subset 195 may be associated with any suitable type of credential, such as loyalty cards, transit cards, payment cards, credit cards, and the like. It is to be understood that if a new credential may be added to a secure element of device 100 but table 199 may not be updated based on such credential addition, then controller 142 may still be operative to make use of that newly added credential through process 500. Even if an AID for a particular payment option is not specifically identified in table 199, that payment option may be instantiated by process 500. In some embodiments, the AIDs of only certain types of credentials may have specific rules added to a routing table. For example, device 100 may be operative to update routing table 199 with a new rule 191 of AID based routing subset 195 for the AID of each new loyalty credential or any other first type of credential added to device 100 (e.g., for the AID of a credential that may be represented by an HCE application but not on a secure element, a rule similar to rule 191-3 may be added to the routing table that may have a first priority destination of an application processor and that may or may not have a second priority destination of a secure element or otherwise) while device 100 may be operative not to update routing table 199 with a new rule 191 of AID based routing subset 195 for the AID of each new credit card credential or any other second type of credential added to device 100 (e.g., for the AID of a credential that may be represented by an applet on a secure element, no specific new rule may be added as a new rule of AID based routing subset 195 but instead a rule similar to rule 191-4 may already exist that may be operative for such an AID and that may have a first priority destination of a secure element and that may or may not have a second priority destination of an application processor or otherwise).

It is understood that the steps shown in process 500 of FIG. 5 are only illustrative and that existing steps may be modified or omitted, additional steps may be added, and the order of certain steps may be altered.

Figure 7:
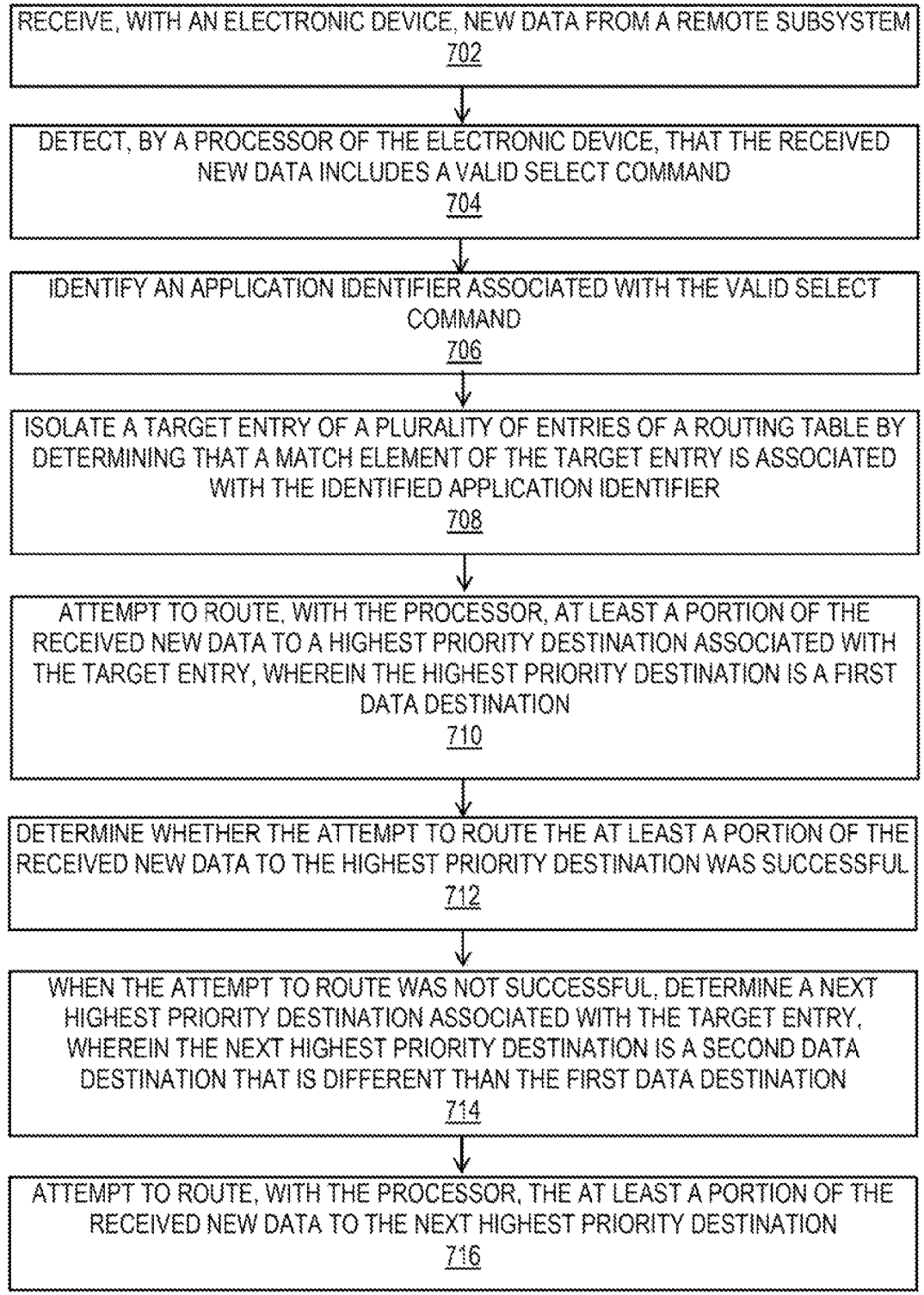
FIGS. 7-10 are flowcharts of other illustrative processes for priority based routing of data on an electronic device.

FIG. 7 is a flowchart of an illustrative process 700 for processing received data on an electronic device. At step 702 of process 700, the electronic device may receive new data from a remote subsystem (e.g., as described with respect to step 502 of process 500, where data 15 may be received at electronic device 100 from remote terminal 220). Next, at step 704 of process 700, a processor of the electronic device may detect that the received new data includes a valid select command (e.g., as described with respect to step 504 and/or step 508 of process 500, where controller 142 may make such a detection). Next, at step 706 of process 700, the electronic device may identify an application identifier associated with the valid select command (e.g., as described with respect to step 504 and/or step 508 of process 500, where controller 142 may make such an identification). Next, at step 708 of process 700, the electronic device may isolate a target entry of a plurality of entries in a routing table by determining that a match element of the target entry is associated with the identified application identifier (e.g., as described with respect to step 504 and/or step 508 of process 500, where controller 142 may make such an isolation by identifying a particular entry 191 of table 199 that may include a match element 192 that is associated with an AID of the valid select command). Next, at step 710 of process 700, the processor may attempt to route at least a portion of the received new data to a highest priority destination associated with the target entry, wherein the highest priority destination is a first data destination (e.g., as described with respect to step 518 of process 500, where controller 142 may make such an attempt to a first priority destination identified by a first priority destination identification 193 of the isolated rule of table 199). Next, at step 712 of process 700, the electronic device may determine whether the attempt to route the at least a portion of the received new data to the highest priority destination was successful (e.g., as described with respect to step 520 of process 500, where controller 142 may make such a determination). Next, at step 714 of process 700, when the attempt to route was not successful, the electronic device may determine a next highest priority destination associated with the target entry, wherein the next highest priority destination includes a second data destination that is different than the first data destination (e.g., as described with respect to step 522 of process 500, where controller 142 may make such a determination by attempting to identify a second priority destination identified by a second priority destination identification 194 of the isolated rule of table 199). Next, at step 716 of process 700, the processor may attempt to route the at least a portion of the received new data to the next highest priority destination (e.g., as described with respect to another iteration of step 518 of process 500, where controller 142 may make such an attempt to a second priority destination identified by a second priority destination identification 194 of the isolated rule of table 199).

It is understood that the steps shown in process 700 of FIG. 7 are only illustrative and that existing steps may be modified or omitted, additional steps may be added, and the order of certain steps may be altered.

Figure 8:
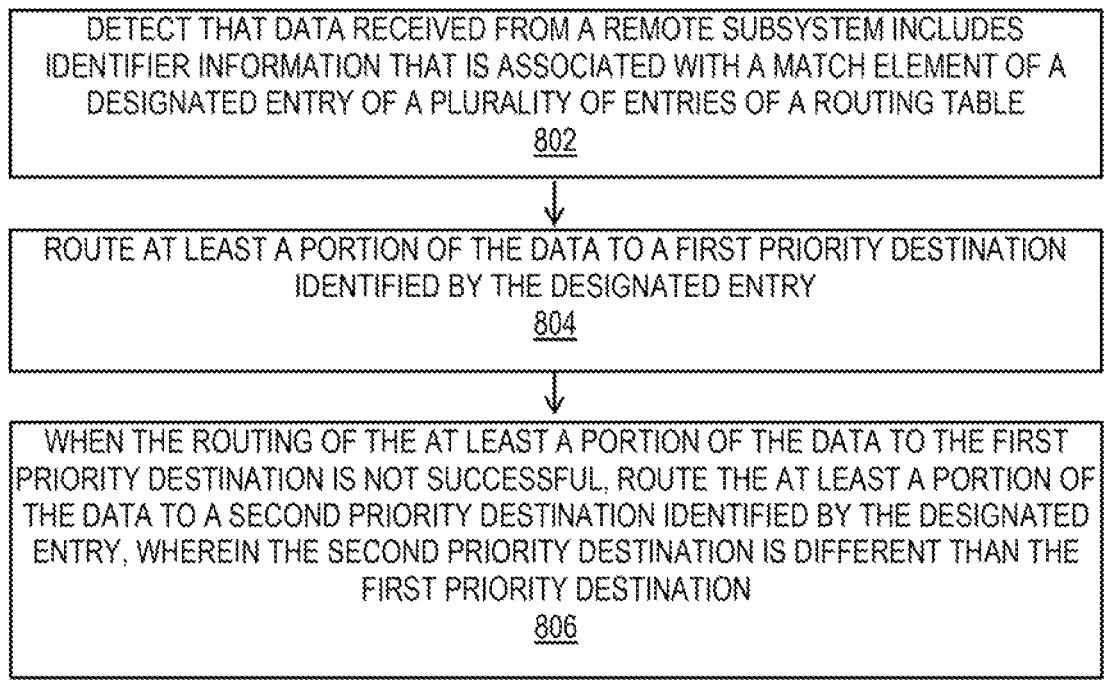

FIG. 8 is a flowchart of an illustrative process 800 for handling data (e g, handling data on an electronic device that may include a routing table). At step 802 of process 800, data received from a remote subsystem may be detected to include identifier information that is associated with a match element of a designated entry of a plurality of entries of the routing table (e.g., as described with respect to step 504 and/or step 508 of process 500, where controller 142 may make such a detection). Next, at step 804 of process 800, at least a portion of the data may be routed to a first priority destination identified by the designated entry (e.g., as described with respect to step 518 of process 500, where controller 142 may route data to a first priority destination identified by a first priority destination identification 193 of the isolated rule of table 199). Next, at step 806 of process 800, when the routing of the at least a portion of the data to the first priority destination identified by the designated entry is not successful at step 804, the at least a portion of the data may be routed to a second priority destination identified by the designated entry, wherein the second priority destination identified by the designated entry is different than the first priority destination identified by the designated entry (e.g., as described with respect to another iteration of step 518 of process 500, where controller 142 may make such an attempt to a second priority destination identified by a second priority destination identification 194 of the isolated rule of table 199).

It is understood that the steps shown in process 800 of FIG. 8 are only illustrative and that existing steps may be modified or omitted, additional steps may be added, and the order of certain steps may be altered.

Figure 9:
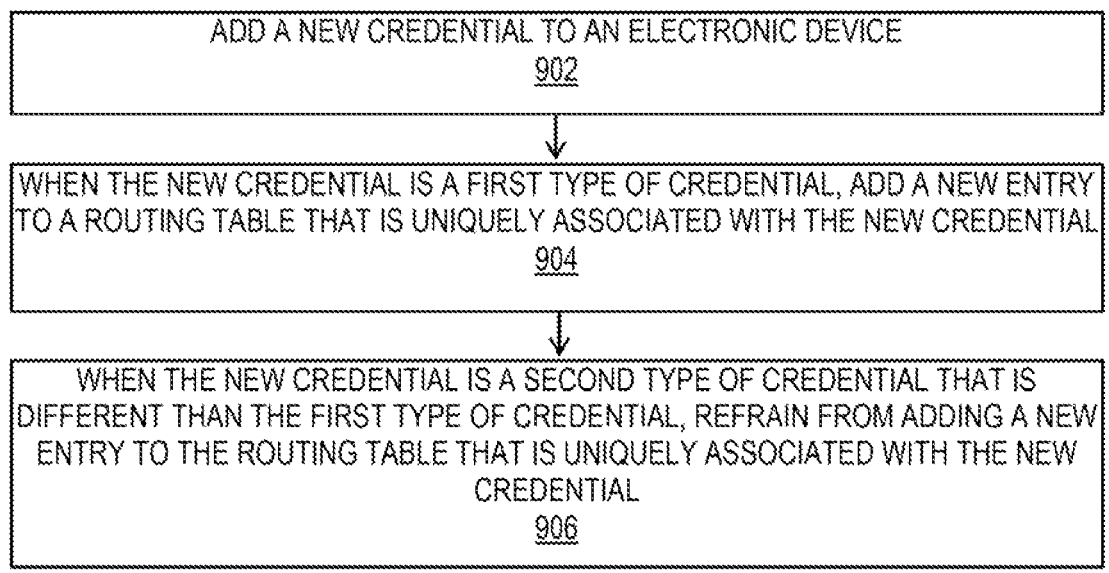

FIG. 9 is a flowchart of an illustrative process 900 for managing a routing table on an electronic device. At step 902 of process 900, a new credential may be added to an electronic device (e.g., a new HCE application or a new secure element applet may be added to device 100). At step 904 of process 900, when the new credential is a first type of credential, a new entry may be added to the routing table that is uniquely associated with the new credential (e.g., a new entry 191 may be added to routing table 199 (e.g., to AID based routing subset 195) that may include a match element 192 that is uniquely associated with the new credential (e.g., the match element 192 of the new rule 191 may include the AID of the new credential)). At step 906 of process 900, when the new credential is a second type of credential that is different than the first type of credential, a new entry may be refrained from being added to the routing table that is uniquely associated with the new credential (e.g., no new entry 191 may be added to routing table 199, but instead an existing entry 191 (e.g., entry 191-4 of protocol based routing subset 196 may be utilized for the new entry (e.g., when the AID of the new credential is not specifically identified by a match element of any rule of AID based routing subset 195 of table 199))).

It is understood that the steps shown in process 900 of FIG. 9 are only illustrative and that existing steps may be modified or omitted, additional steps may be added, and the order of certain steps may be altered.

Figure 10:
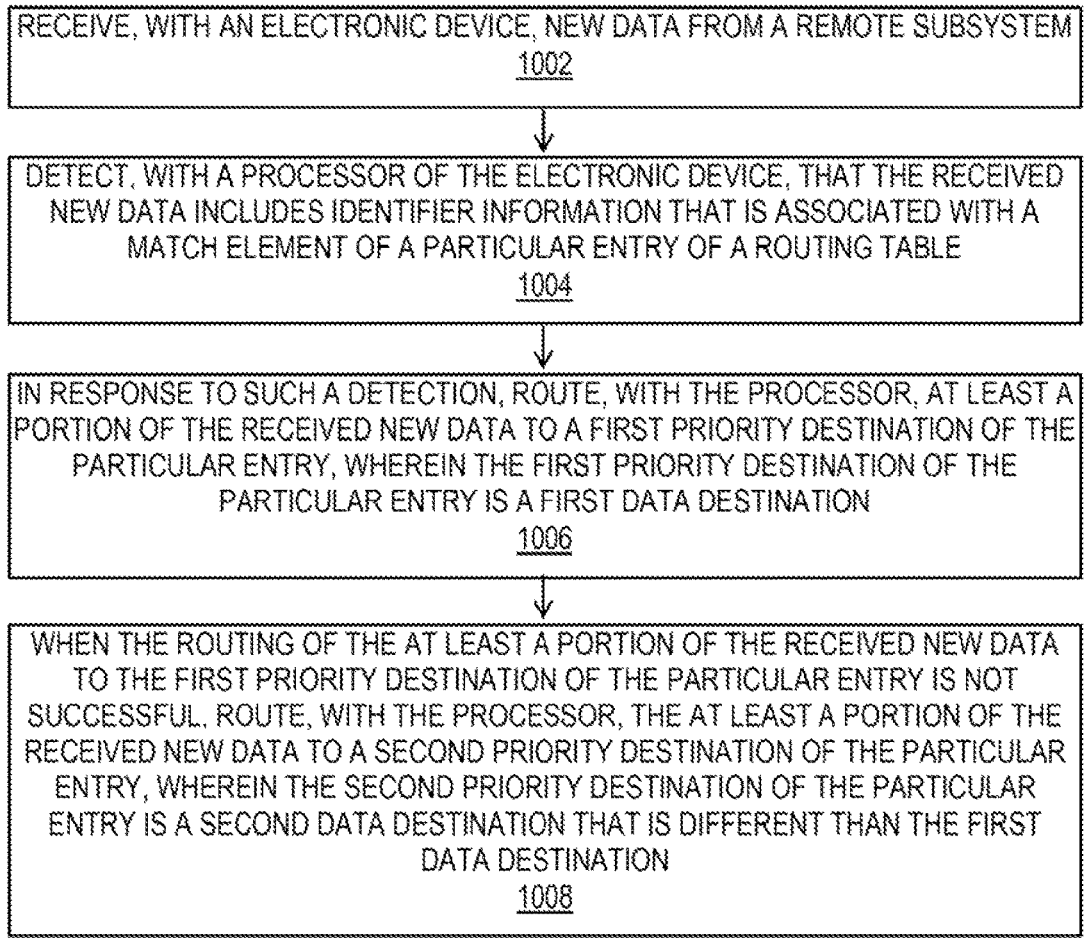

FIG. 10 is a flowchart of an illustrative process 1000 for handling data (e.g., handling data on an electronic device from a remote subsystem, wherein the electronic device may include a processor, a first data destination, a second data destination that is different than the first data destination, and a routing table that may include a plurality of entries, wherein a particular entry of the plurality of entries may include a match element and identification of at least two priority destinations that may include a first priority destination and a second priority destination). At step 1002 of process 1000, the electronic device may receive new data from a remote subsystem (e.g., as described with respect to step 502 of process 500, where data 15 may be received at electronic device 100 from remote terminal 220). Next, at step 1004 of process 1000, a processor of the electronic device may detect that the received new data includes identifier information that is associated with a match element of a particular entry of a routing table (e.g., as described with respect to step 504 and/or step 508 of process 500, where controller 142 may make such a detection). Next, at step 1006 of process 1000, in response to the detection of step 1004, the processor may route at least a portion of the received new data to a first priority destination of the particular entry, wherein the first priority destination of the particular entry is a first data destination (e.g., as described with respect to step 518 of process 500, where controller 142 may make such a route of data to a first priority destination identified by a first priority destination identification 193 of a particular rule of table 199). Next, at step 1008 of process 1000, when the routing the at least a portion of the received new data to the first priority destination of the particular entry is not successful at step 1006, the processor may route the at least a portion of the received new data to a second priority destination of the particular entry, wherein the second priority destination of the particular entry is a second data destination that is different than the first data destination (e.g., as described with respect to another iteration of step 518 of process 500, where controller 142 may make such a route of data to a second priority destination identified by a second priority destination identification 194 of the isolated rule of table 199).

It is understood that the steps shown in process 1000 of FIG. 10 are only illustrative and that existing steps may be modified or omitted, additional steps may be added, and the order of certain steps may be altered.

One, some, or all of the processes described with respect to FIGS. 1-10 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory 142*m* and/or memory module 150 of FIG. 2). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 and/or memory 142*m* and/or memory module 150 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

While there have been described systems, methods, and computer-readable media for priority based routing of data on an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for processing received data on an electronic device, the method comprising:
   receiving, by the electronic device, new data from a remote subsystem;
   detecting, by a processor of the electronic device, that the received new data comprises a valid select command;
   identifying an application identifier associated with the valid select command;
   isolating, in a routing table comprising a plurality of entries, a target entry of the plurality of entries by determining that a match element of the target entry is associated with the identified application identifier, wherein the determining that the match element of the target entry is associated with the identified application identifier comprises determining that no match element of the routing table comprises the identified application identifier;

attempting to route, with the processor, at least a portion of the received new data to a highest priority destination associated with the target entry, wherein the highest priority destination comprises a first data destination;

determining whether the attempt to route the at least a portion of the received new data to the highest priority destination was successful; and when the attempt to route was not successful:
determining a next highest priority destination associated with the target entry, wherein the next highest priority destination comprises a second data destination that is different than the first data destination; and attempting to route, with the processor, the at least a portion of the received new data to the next highest priority destination.

2. The method of claim 1, further comprising:
receiving, by the electronic device, other new data from the remote subsystem;
detecting, by the processor of the electronic device, that the received other new data comprises an other valid select command;
identifying an other application identifier associated with the other valid select command;
isolating, in the routing table, an other target entry of the plurality of entries by determining that a match element of the other target entry is associated with the identified other application identifier, wherein the determining that the match element of the other target entry is associated with the identified other application identifier comprises determining that the match element of the other target entry comprises the identified other application identifier.

3. The method of claim 1, further comprising, when the attempt to route the at least a portion of the received new data to any specific destination associated with the target entry was successful, storing, on the electronic device, information indicative of the specific destination.

4. The method of claim 3, further comprising:
receiving, after the storing, additional new data from the remote subsystem;
detecting, with the processor, that the received additional new data does not comprise any valid select command; and
routing, responsive to the detecting, at least a portion of the received additional new data to the specific destination indicated by the stored information.

5. The method of claim 1, wherein the receiving comprises receiving the new data from the remote subsystem in a contactless proximity-based communication.

6. The method of claim 1, wherein one of the first data destination or the second data destination comprises a secure element of the electronic device.

7. The method of claim 6, wherein the other one of the first data destination or the second data destination comprises a destination that is not on the secure element.

8. The method of claim 6, wherein the other one of the first data destination or the second data destination comprises another secure element on the electronic device that is different than the secure element.

9. The method of claim 1, wherein the detecting comprises detecting that the received new data comprises a valid select application protocol data unit command as defined by a particular standard.

10. The method of claim 1, wherein:
the first data destination comprises a secure element of the electronic device; and
the second data destination comprises another processor of the electronic device that is different than the processor.

11. An electronic device comprising:
a first data destination;
a second data destination that is different than the first data destination;
a routing table comprising a plurality of entries, wherein at least a specific entry of the plurality of entries comprises a match element and identification of at least two priority destinations comprising a first priority destination and a second priority destination; and
a processor operative to:
receive new data from a remote subsystem;
detect that the received new data comprises identifier information that is associated with the match element of the specific entry of the routing table, wherein the processor is operative to detect that the received new data comprises identifier information that is associated with the match element of the specific entry by determining that no match element of the routing table comprises the identifier information of the received new data;
attempt to route, responsive to the detection, at least a portion of the received new data to the first priority destination of the specific entry, wherein the first priority destination of the specific entry comprises the first data destination; and
when the attempt is not successful, route the at least a portion of the received new data to the second priority destination of the specific entry, wherein the second priority destination of the specific entry comprises the second data destination.

12. The electronic device of claim 11, wherein the first data destination comprises a secure element of the electronic device.

13. The electronic device of claim 12, wherein the second data destination comprises a destination not on the secure element.

14. The electronic device of claim 12, wherein the second data destination comprises another secure element of the electronic device that is different than the secure element.

15. The electronic device of claim 12, wherein the second data destination comprises another processor that is different than the processor.

16. The electronic device of claim 11, wherein the second data destination comprises a secure element of the electronic device.

17. The electronic device of claim 16, wherein the first data destination comprises a destination not on the secure element.

18. The electronic device of claim 16, wherein the first data destination comprises another processor that is different than the processor.

19. The electronic device of claim 11, wherein the processor is further operative to:
receive other new data from the remote subsystem; and
detect that the received other new data comprises other identifier information that is associated with a match element of an other specific entry of the routing table by determining that the match element of the other specific entry comprises the other identifier information of the received other new data.

20. A non-transitory computer-readable storage medium storing at least one program comprising instructions, which when executed, cause an electronic device to:
  detect that data received from a remote subsystem comprises identifier information associated with a match element of a designated entry of a plurality of entries of a routing table by determining that no match element of the routing table comprises the identifier information of the received data;
  route at least a portion of the received data to a first priority destination identified by the designated entry; and
  when the routing of the at least a portion of the received data to the first priority destination is not successful, route the at least a portion of the received data to a second priority destination identified by the designated entry, wherein the second priority destination is different than the first priority destination.

\* \* \* \* \*